July 6, 1954  L. PEARLE  2,683,071
TRAFFIC MONITORING SYSTEM
Filed Jan. 31, 1949  2 Sheets-Sheet 1

INVENTOR.
Leon Pearle
BY Paul S. Martin
ATTORNEY

INVENTOR.
Leon Pearle
BY
Paul S. Martin
ATTORNEY

Patented July 6, 1954

2,683,071

UNITED STATES PATENT OFFICE 2,683,071

TRAFFIC MONITORING SYSTEM

Leon Pearle, New York, N. Y.

Application January 31, 1949, Serial No. 73,680

7 Claims. (Cl. 346—107)

The present invention relates to traffic monitoring systems, and more particularly, to systems for providing evidence of speed violations automatically, and in such manner are to avoid challenge to the innocent.

Control of traffic at important intersections has long been controlled by traffic lights, to achieve a result that would otherwise require a fantastic number of traffic officers. However, there seems to have been no workable substitute for the speed patrol officer in enforcing the established maximum speed limits. The patrol system is in many respects unsatisfactory. Effective enforcement would require costly increases in patrol personnel; and the present personnel could perform many useful functions if they were relieved of the hazardous speed-patrol duty.

An object of the present invention is to provide an automatic traffic monitoring system for affirmatively identifying vehicles guilty of speeding to the exclusion of other vehicles on the scene that are not guilty of speed excesses.

In my copending application Serial No. 59,228, filed November 10, 1948, the use of a camera is disclosed which is controlled by an elapsed-time measuring device to take a photograph of a car that completes a measured length of travel in less than a permissible minimum of time. That system may expose slow cars appearing in photographs with speeders to the risk of false charges of speeding. In like sense the guilty may avoid a speeding penalty in the event that any other vehicle should be photographed at the same time: each could defend on the ground that the other was the speeder that actuated the system. A purpose of the present invention is to provide a more certain system for furnishing evidence against speeders.

Traffic analyzing systems have been proposed heretofore for detecting vehicles traveling above certain speeds, on a statistical basis and with a permissible latitude of error. Such systems generally involve a pair of vehicle detectors spaced a measured distance apart along a road, with an electrical or mechanical elapsed-time checking device controlled successively, by the detectors. For statistical purposes it may be entirely appropriate to set the detectors close together, so that only one vehicle is likely to be in the region of both detectors during any elapsed-time measuring period. For traffic control, however, it is not usually considered proper to hold for speeding an individual who accelerated momentarily. A minimum stretch of road, such as one-quarter of a mile on highways, is often considered necessary for checking speed. Now, if an elapsed-time device is to be utilized with detectors spaced apart by such a distance, confusion is likely to arise due to multiple vehicles entering the zone before any one of them emerges. Conceivably, multiple elapsed-time meters can be tripped in succession. This complicates the system to the point where it may be unworkable; and it provides no assurance that the check is reliable since such system is likely to be based on the false presumption that the vehicles pass the second detector in the same order that they pass the first. A slow car may trip one elapsed-time meter, then be passed by a speeding car that starts a second elapsed-time device, and finally the first car may arrest the second meter so as to be identified erroneously with the elapsed-time meter of the second car.

The foregoing difficulties are largely eliminated by the present invention. Two cameras are positioned at separated locations to photograph vehicles traveling along a road, and each camera is tripped by a detector that is responsive to vehicles traveling by each location at an excessive speed. The reading of a clock associated with each camera is recorded with the vehicle photographed at the same instant and preferably on the same film. Each clock provides indication of seconds and, in some cases, fractions of seconds. This system provides evidence that every car that passed either location at an excessive speed did not stop between the two locations and resume travel later on, because the exact time interval of transit between the two locations is available from the clock readings accompanying photographs of the same vehicle, and a car that stopped between the speed detectors would take more than the short interval of a car traveling at a sustained excess speed between those locations. Cars not speeding at either location do not activate the cameras; and if cars proceeding legally are photographed together with speeders, they cannot be confused with the speeders since they do not appear in two photographs taken within an unduly brief time interval as evidenced by the time records. Cars speeding at both locations will be photographed, and their travel time over the measured distance will be known, irrespective of the number of cars present and their order as they pass the two detectors.

The speed-responsive detectors are relied on to show separate incidents of speeding; and the detectors are additionally relied on to limit the number of photographs taken, both for avoiding waste of film and for facilitating examination of the photographic record. The clock readings are relied on to show excessive sustained speed between the two locations. It is possible to set two clocks exactly; and if they are of the synchronous type, electrically driven from a common alternating-current supply, or if they are otherwise synchronized, they will continue to run at identical rates, so that their purpose will be fulfilled. However, lightning, power interruptions and surges, and other disturbances might upset the readings, so as to lay the photographic evidence open to doubt. To improve the reliability of the system a further check is provided. Both clock recorders are activated simultaneously, preferably at regular intervals. If the clocks both have the identical reading at all times in the check exposures, there is no doubt that the difference in time records accompanying paired photographs of a vehicle truly represents its time of transit between the two locations. If there is any discrepancy in simultaneously taken clock-checking records, those records will supply the necessary correction for finding the true elapsed time. Even if the actual readings of the synchronous clocks at the two locations are widely different, the necessary elapsed-time data can be found, except in unusual circumstances; and even then the system does not impute guilt to the innocent. For this reason it represents a trustworthy automatic traffic-patrol aid, freeing vehicle patrols for emergency duty and other vital services where they cannot be replaced.

Two embodiments of the invention are described below and are shown in the accompanying drawings, from which the invention will be more fully appreciated, and further objects and features of novelty will become apparent.

Figure 1:
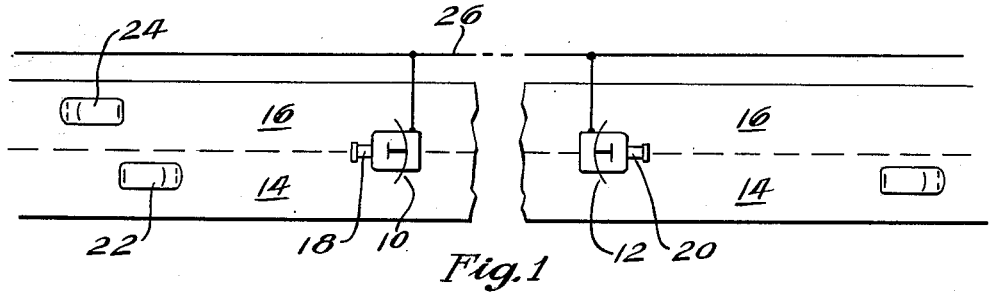
Fig. 1 shows one illustrative form of the invention diagrammatically, employing vehicle detectors responsive to rate-of-approach and rate-of-departure.

In Fig. 1, one form of the invention is illustrated which employs radio signals directed along the road for detection of speeding vehicles. This type of detector is not of itself new. It has been described in numerous publications, for example in an article by Walter van B. Roberts in the July 1946 issue of "Electronics."

The illustrative detectors of speeding vehicles are represented at 10 and 12 as including directive antennas directed away from each other along the road and spaced apart by a measured distance such as a quarter-mile. The beam of each is broad enough to cover both lanes 14 and 16 of traffic. A radio signal transmitted from either antenna is reflected from stationary objects and moving objects alike, being stronger for close objects than for remote objects. In the case of moving objects, the frequency of the reflected signal differs from the frequency of the transmitted signal by a number of cycles per second that depends on the transmitted-signal frequency and on the speed of the reflecting object in approaching or departing. The transmitted signal is of fixed frequency, in this illustrative detector, so that the frequencies of the reflected signals will represent the speeds of all vehicles in the field of the antenna that reflect toward the antenna. The frequency-difference, which depends on the Doppler effect, is the same for cars traveling at the same speed whether they approach or depart. The difference is derived by beating the frequency-shifted signal with the transmitted signal, as is well known, so that the beat-frequency is a measure of the vehicle speeds. By filtering out beat frequencies above a given level, the low beat frequencies corresponding to legal vehicle speeds can be suppressed, and the detector will then be responsive exclusively to speeding vehicles. It is significant that one speeding car in a group of cars proceeding at moderate speeds will activate the detector.

The beat frequency can be conventionally amplified and limited so that there is assurance that the frequency alone controls response, and not the strength of signal. However, the beat-frequency signal strength is here utilized for tripping the camera 18 or 20 associated with the respective speed detector when the vehicle is fairly in the range of the camera and is speeding. In this way, the front end of speeding car 22 approaching camera 10 will be photographed. The camera (and the radio speed detector) can be supported somewhat like a traffic light above the heights of all passing vehicles; and from such vantage point the front license plate will be clear, additional identity of the car will be photographically recorded, and the driver may even appear in the photograph. The exposure is made when the beat frequency and the signal strength jointly indicate a vehicle (1) exceeding an established limit and (2) in the range of the camera.

Figure 5:
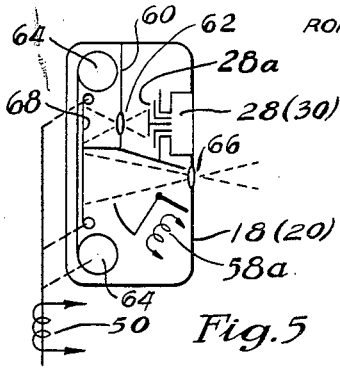
Fig. 5 is a diagrammatic view of an illustrative form of electrically actuable camera and associated clock that may be used in practicing the invention.

The camera is advantageously adapted to record further data on the same film, of a form as in Fig. 5 or as disclosed in my copending application previously mentioned. To less advantage, the further data may be mechanically recorded on the film, or even on an associated paper strip. At the left in Fig. 2, the image of car 22 is shown, together with the date, the route, and the location, and the time in hours, minutes, seconds and parts of a second. The precision of the time record is important, not merely to establish the time of the traffic violation. The exact time record supplants the elapsed-time registers and delay mechanisms of known traffic survey systems. In order that the recording time-clocks at the two locations in Fig. 1 are held to synchronism, synchronous electric clocks are advantageously used, energized from a common alternating-current bus 26 that may also furnish power for operating the speeding-vehicle detectors. Once set at exactly the same reading, synchronous clocks are known to maintain identity of readings under normal circumstances.

Figure 2:
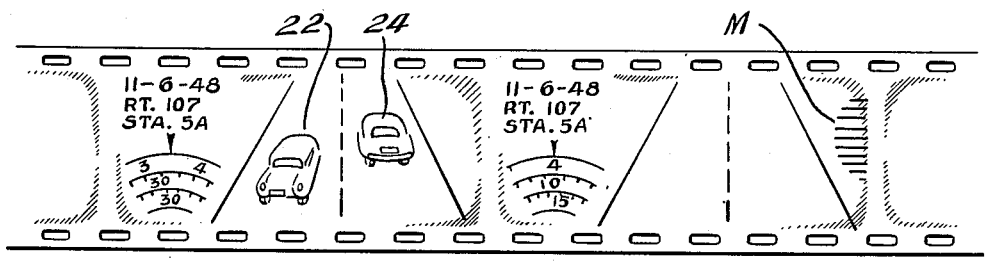
Figs. 2 and 3 are illustrative film records of detector-activating vehicles together with their time records.

Now, if car 22 speeds as it approaches detector 10 and camera 18, it will be photographed with the exact time (and other data that may be desired), as shown in Fig. 2. It proceeds along the road at a more-or-less constant rate until the known distance to detector 12 and camera 20 has been traversed. If it is still speeding, it is again photographed, inevitably together with the exact time record. The short travel time between the two locations proves sustained excess speed.

It is not vital that the speed indicator be accurate. Were each indicator set to respond slightly below the speed limit, cars proceeding legally would then be photographed at each location; but the difference in time recorded in each of the photographs would establish the fact that they traveled at legal rates. For this reason there is no great need for a detector of high precision that might prove costly. Nevertheless, if the detectors are set somewhat above the legal limit and the time record establishes a short travel interval, there is proof that the car was speeding at the start and at the end of the measured distance, and that (with a reasonably limited distance such as a quarter-mile) the excess speed was sustained. If the car slowed down or stopped between the cameras, a greater time interval would elapse, and this would appear from the records.

Figure 3:
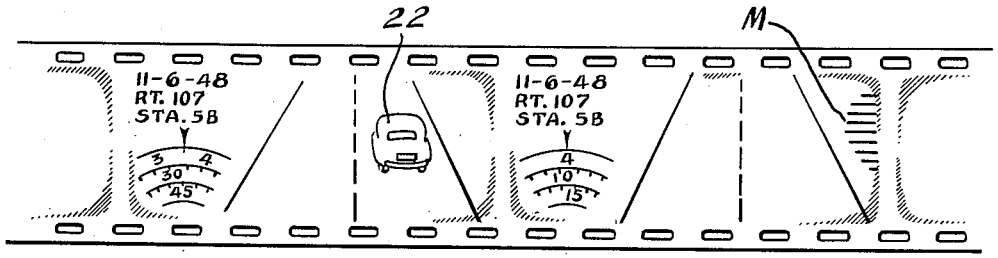

Other cars would in some instances appear together with the speeding car, as car 24 in Figs. 1 and 2. If that car, identified by its license plate and its appearance as well, does not appear in the film strip of the second camera within the short interval corresponding to illegal rates, there will be no proof of speed violation; but if both cars 22 and 24 traveled the distance between the cameras at excessive speeds, neither car escapes. Fig. 3 shows the record that car 22 would make if it should speed past camera 20 which is the second camera for that direction of travel.

Figure 4:
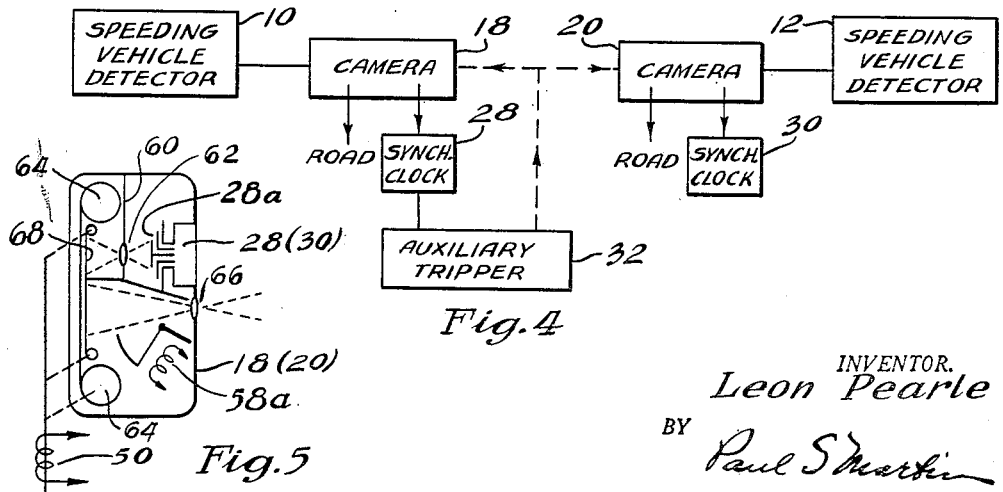
Fig. 4 is a block diagram of systems employing features of the invention.

A block diagram appears in Fig. 4 illustrating the foregoing, and a further feature in addition. Speeding vehicle detector 10 controls camera 18 to photograph the road at its location as a speeding car passes, and at the same time, the indication of a synchronous clock 28 is photographically recorded on an adjoining area of the film. The time is recorded in hours, minutes, seconds, and parts of a second. The date and Route Number and camera location are also recorded. Speeding vehicle detector 12 similarly controls camera 20 to photograph the road at its location as a speeding car passes, and concurrently the time is recorded, to seconds and parts of seconds, as indicated by synchronous clock 30. Provided both clocks are originally set at precisely the same indication, the difference in readings gives the elapsed time for a photographed car to travel between the camera locations.

It is possible to synchronize the indications of the clocks automatically, if the setting mechanisms are specially designed, through synchronizing pulses transmitted over the power line; and they will operate synchronously since they are connected to the same alternating current supply the frequency of which determines their rate of operation.

Without using specially designed clocks, and to provide a further link in the evidence against speeders, another check is provided. An auxiliary tripper 32 is shown, suitably controlled as by one of the synchronous clocks, to emit a signal simultaneously tripping the clock portions of both cameras. Frames on the film exposed under control of the auxiliary tripper are to be identified by a characterizing marker or by a shield dropped in front of the "road" portion of each camera when a time-check exposure is being made; the fact of true synchronism of the clocks is thereby evidenced on the same film strip that also bears the photographs and time records of speeding cars. If there should happen to be a difference between the two clocks, that difference is known from the check exposures and can be used as a correction factor for the adjoining exposures of speeding vehicles. In this way, conventional synchronous electric clocks at the two locations can be used even if they are not both adjusted to the identical reading; and specially designed self-adjusting clocks if used will be proved correct by the "marker" or check photographs. Specimens appear in Figs. 2 and 3 to the right of the "speeding car" exposures, characterized by marker M in the "road" portion of check frames. One manner of accomplishing this check exposure is included in the description below.

Figure 6:
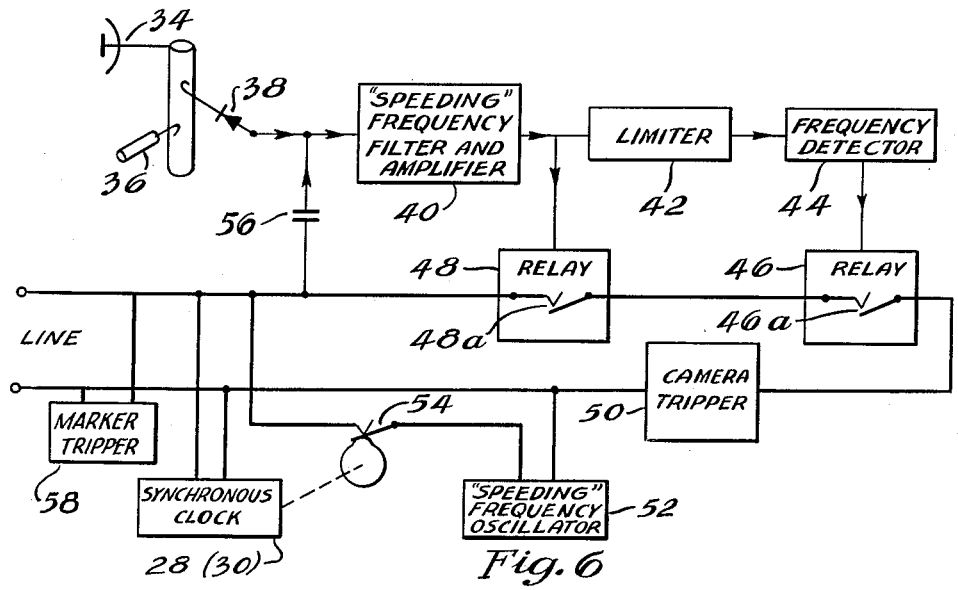
Fig. 6 is a combined block and circuit diagram of the apparatus at one of the locations in Fig. 1.

The combined block and wiring diagram of the apparatus at one location is shown in Fig. 6, it being understood that the apparatus at the other location may be identical although the auxiliary tripping means need be included at only one of the locations.

Antenna 34 is energized by a klystron or other signal generator 36 to transmit a wave, the reflection of which is received by the same antenna. If the reflection is of different frequency, a "Doppler" beat note is produced in diode 38. This is advantageously filtered to pass signals of "speeding" frequency or higher, amplified in unit 40, limited in unit 42, and detected in unit 44 so that relay 46 will close contacts 46a only when the reflected signal of a speeding car is received by the antenna. Relay 48 is energized by filter 49 without limiting action. In this way camera actuator 50 in series with contacts 46a and 48a is energized only when the filtered signal-strength is high, and provides assurance that the vehicle is properly in range of the camera.

An oscillator 52 included at one of the locations, or at both, impresses a strong signal of "speeding" (beat) frequency on the line 26 at regular or random intervals, optionally under control of a synchronous clock 28 (and/or 30) and cam switch 54. Filters 49 at the two locations, coupled through attenuators 56 to the line 26, will respond to the oscillator signal and simultaneously cause actuation of both cameras; and a marker tripper 58 at each location, energized by a filter coupled to the line and including an implifier having a "speeding" frequency filter and a marker mechanism 58a (Fig. 5), produces mark M (Figs. 2 and 3) in the "road" field of each camera to designate check exposures. Attenuator 56 prevents "speeding" frequency signals in diode 38 from actuating the marker tripper.

A form of camera that will function as part of the speed-evidencing apparatus described is illustrated in Fig. 5. It incorporates a clock 28 (30) having dials 28a bearing the hours, minutes, and seconds as indicated in the photographic images of Figs. 2 and 3, and having an index mark from which fractions of seconds can be determined. Light stencils (not shown) associated with the clock dials provide the further data in the illustrated photographic images. A suitable light source illuminates the dials. A light barrier 60 divides this section of the camera from that intended to record the image of the road, and a lens 62 projects the clock and other figures toward the film stretched between reels 64. A second lens 66 projects the road image toward the film, and the exposure is taken under control of actuator 50 that trips focal-plane shutter 68 and then rewinds the shutter and advances the film one frame.

The foregoing organization for detection of speeding cars utilizes radio waves, and depends on the Doppler effect for speed detection. Supersonic waves may also be used in like manner to respond to the Doppler frequency-shift caused by speeding vehicles. Also, radio and supersonic waves can be utilized in detectors that do not depend on the Doppler effect for evidencing the presence of speeding vehicles. The system described is notable in that it not only photographs the vehicles speeding past both locations, together with the exact time that they pass each location and thereby proves elapsed travel time between the locations, but provides front and rear views of such vehicles for affirmative identification of the vehicle and, possibly, for identification of the driver in the "approaching" view.

It is notable that the device is secret. The motorist is not cautioned to proceed slowly in those few locations where automatic cameras are installed. During daylight hours there is no indication to the motorist that such a system is in operation. At night infra-red light may be used for illumination, flash illumination for power economy.

The mere presence of the equipment if not camouflaged may deter the speeder momentarily. To avoid this without going to the expense of installing the automatic cameras everywhere, dummy containers resembling the camera equipment can be installed at many locations and discourage speeding everywhere.

Figure 7:
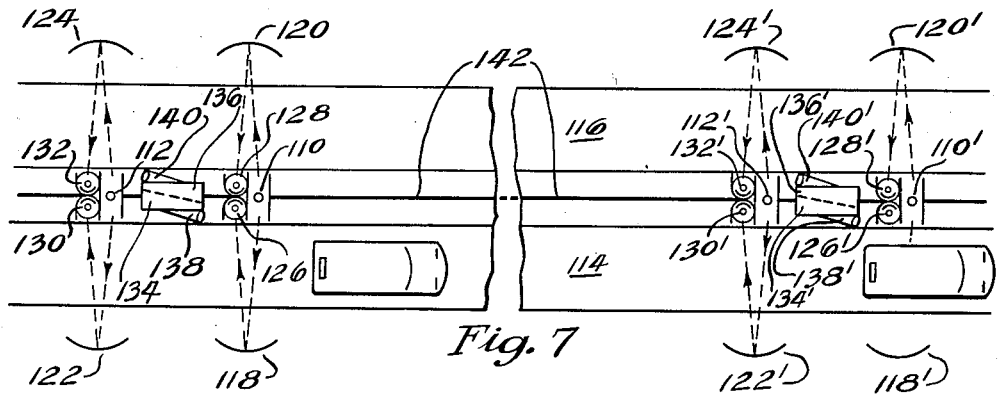
Fig. 7 illustrates a second form of the invention employing another type of speed detector.

A modification of the foregoing system is shown in Fig. 7, illustrating photoelectric speeding-vehicle detectors in place of the Doppler-effect radio detectors of Fig. 1. The system used in Fig. 7 is organized as in Fig. 4, and includes a clock and camera as in Fig. 5. A pair of lamps 110 and 112 are shown, preferably of the glow type energized by a high frequency electrical supply of the order of 1000 cycles per second. The high frequency light enables the apparatus to distinguish its own light from daylight, without disturbing its response to high vehicle speeds. Light from these lamps is directed across roads 114 and 116 to reflectors 118, 120, 122, and 124, and back to the respective photocells 126, 128, 130 and 132. Suitable directive means is provided to prevent light from lamp 110 from reaching either cell 130 or 132. Each lamp is supported close to its related cells; and while the lamps and cells are shown in sidewise alignment to simplify the drawing, they may advantageously be arranged in vertical alignment. Units 134 and 136 contain circuitry responsive to successive interruption of the light beams by cars traveling along roads 114 and 116, respectively. Unit 134 may contain a condenser, the charging of which is initiated by interruption of a first beam and the interruption of charging is effected upon interruption of the second beam. If the condenser is charged at all but does not exceed a certain level, the vehicle that interrupted both beams is known to be speeding. If so, the camera 138 associated with unit 134 is tripped to photograph the road and a self-contained clock; and unit 136 similarly trips camera 140. Such a photoelectric speed-responsive detector is, in principle, disclosed in Patent 2,181,728 issued November 28, 1939, to C. D. Greentree.

A second, like assembly, designated by corresponding primed numerals, is positioned at a second location at a measured distance down the road. Photocells 126 and 130 or a like pair of sensing elements may be a yard apart, while the assemblies may be a quarter-mile apart. Paired photographs of the same car taken within a calculated short time interval as evidenced by the time record proves excessive speed at each location as well as sustained excessive speed.

The form of speed detector used should be unobvious to the motorist. One important consideration is that each location is to include a speed-responsive detector so that only speeding vehicles will consume film and build up the photographic record; and that synchronized or synchronous clocks be included with the respective cameras. A common power line for supplying alternating current to synchronous clocks at both locations is indicated at 142 in Fig. 6. An auxiliary tripper as in Fig. 4 is included in the system of Fig. 6, just as in the system of Fig. 1.

The systems of Figs. 1 and 7 employ cameras and clocks at two locations because the distance between the speed-detection stations may be too great for satisfactory photography. Where the speed-detection stations are permitted to be close together a single camera can be tripped successively by speed detectors at spaced locations to photograph speeding vehicles twice; and in that event a single clock can be used to record the time of each photograph and thus provide the elapsed (travel) time of speeders between the two locations. Similarly, a pair of detector-controlled cameras at one location, oppositely directed along a road toward spaced-apart speed-detection locations, can utilize the same clock mechanism (as with two sets of time dials) for recording the precise time and thus the elapsed time related to photographs of vehicles that actuated the speed detectors. In both cases there is no need for checking the synchronism of two clocks; the elapsed time between related photographs is entirely reliable.

A latitude of substitution and rearrangement of component parts of the foregoing illustrative embodiments of the invention will occur to those skilled in the art and for this reason the claims that follow should be accorded such broad interpretation as is commensurate with the spirit and scope of the invention.

What is claimed is:

1. Apparatus for evidencing the excessive speed of vehicles traveling along a road comprising separate means effective at two locations separated by a known distance for detecting vehicles passing said two locations traveling above a predetermined speed, integrated synchronous time indicating and display means at each location having a synchronizing interconnection therebetween and including means for displaying and indicating time in seconds, a single photographic means directed at said road at each of the two locations each simultaneously actuable under control of the respective vehicle detecting means and in image-recording relation to the respective time indicating and display means for concurrently photographing images of a detector-actuating vehicle and of the time said vehicle passes the respective locations.

2. A system for evidencing the passage of vehicles along a road at sustained speeds exceeding an established rate comprising a first excess-speed responsive vehicle-detector effective at a first location along said road, a first camera directed along the road and controlled by said first detector to photograph on a first film vehicles momentarily speeding past the first location causing operation of the speed responsive means, and means including a first clock in image-recording relation to said camera to make a record on said first film of the time of operation of said first camera, a second excess-speed responsive vehicle-detector at a second location along said road, a second camera directed along the road and controlled by said second detector to photograph on a second film vehicles momentarily speeding past the second location, and means including a second clock in image-recording relation to said second camera to make a record on said second film of the time of operation of said second camera, the elapsed travel time between the two locations separated by a known distance thus being known for properly identified vehicles, and coordinating interconnection between said time recording means insuring synchronous advance of the indications thereof.

3. Apparatus for evidencing the average travel speed between two locations on a road separated by a known distance, comprising multiple detectors each at a respective location responsive to vehicles exceeding a given speed, a clock associated with each detector, means controlled by each detector when actuated by a speeding vehicle for recording concurrently the image of a detector-actuating vehicle and of the associated clock indication, and periodically actuated means for operating said recording means to record the indication of said clocks simultaneously independently of said detectors.

4. Apparatus for automatically evidencing the transit time of vehicles traveling through a predetermined distance along a road, comprising a pair of oppositely directed Doppler frequency-shift vehicle detectors effective at positions separated by a predetermined distance, integrated time indicating means having a seconds indicator, and a piar of cameras oppositely directed along the road and controlled by said detectors and in image-recording relation to the integrated time indicating means for concurrently photographing detector-actuating vehicles and the time each photograph is taken on a single film in each camera to provide a record of elapsed time identified with each vehicle that activates said detectors at both locations.

5. Apparatus for evidencing the average travel speed between two locations on a road separated by a known distance, comprising multiple detectors each at a respective location responsive to vehicles exceeding a given speed, a clock associated with each detector, means controlled by each detector when actuated by a speeding vehicle for recording concurrently the image of a detector-actuating vehicle and of the associated clock, timer-actuated means connected to the recording means for operating said recording means to record the indications of said clocks simultaneously independently of said detectors, and means controlled by said timer-actuated means for modifying the record produced under control of the clock recording means to distinguish records resulting therefrom from records made in response to detector control.

6. The method of detecting vehicles travelling along a road at sustained excess speed comprising the step of photographing on respective films the images of detected speeding vehicles as they pass each of two locations separated by a known distance and concurrently recording on the corresponding film the exact time that the detected speeding vehicles pass each location, so that the vehicles speeding through the known distance will be identified at the start and end of the distance with the respective time records on the corresponding films bearing images of the vehicles irrespecitve of the sequence of vehicles speeding past the two locations, and bringing into association with each other the resulting records of the images of the same vehicles which were speeding past both locations, to enable determination of whether the time interval between detection at each location was less than that corresponding to a vehicle traveling through the known distance at the maximum legal speed.

7. Traffic monitoring apparatus including vehicle-speed-responsive detector means both set to the same speed and arranged at separate locations, photographic means at each location responsive to the detector means, time registering means at each location, a recording medium having successively exposable frames arranged at each location and simultaneously receiving the vehicle image and the time registering image on a single exposed frame, and interconnecting means maintaining the separated time registering means in synchronism for reliable time computation.

References Cited in the file of this patent

UNITED STATES PATENTS

| Number | Name | Date |
|---|---|---|
| 1,849,939 | Lipshitz | Mar. 15, 1932 |
| 2,045,414 | Rumpel | June 23, 1936 |
| 2,091,357 | Goldsmith | Aug. 31, 1937 |
| 2,160,006 | Thompson et al. | May 30, 1939 |
| 2,250,442 | Abell | July 29, 1941 |
| 2,347,194 | Holliday | Apr. 25, 1944 |
| 2,349,355 | Kepler | May 23, 1944 |
| 2,402,464 | Suter | June 18, 1946 |
| 2,477,567 | Barker | Aug. 2, 1949 |

FOREIGN PATENTS

| Number | Country | Date |
|---|---|---|
| 279,959 | Great Britain | Nov. 10, 1927 |